United States Patent [19]
Odendahl et al.

[11] Patent Number: 5,644,847
[45] Date of Patent: Jul. 8, 1997

[54] COMPASS SAW

[75] Inventors: Alfred Odendahl, Waldenbuch, Germany; Aldo Di Nicolantonio, Recherswil; Urs Ruepp, Solothurn, both of Switzerland

[73] Assignee: Scintilla AG, Solothurn, Switzerland

[21] Appl. No.: 625,600

[22] Filed: Apr. 3, 1996

[30] Foreign Application Priority Data

Apr. 7, 1995 [DE] Germany .................. 195 13 076.6

[51] Int. Cl.$^6$ ..................................... B27B 11/02
[52] U.S. Cl. ................... 30/394; 30/371; 30/392
[58] Field of Search ............... 30/371, 374, 392, 30/393, 394

[56] References Cited

U.S. PATENT DOCUMENTS

| | | | |
|---|---|---|---|
| 1,855,371 | 4/1932 | Ungar | 30/394 |
| 2,621,685 | 12/1952 | Butz | 30/394 |
| 2,668,567 | 2/1954 | Olson | 30/392 |
| 2,775,272 | 12/1956 | Papworth | 30/393 |
| 3,388,728 | 6/1968 | Riley, Jr. et al. | 30/392 |
| 4,250,624 | 2/1981 | Partington | 30/374 |
| 4,628,605 | 12/1986 | Clowers | 30/393 |
| 4,665,617 | 5/1987 | Maier et al. | 30/374 |
| 4,837,935 | 6/1989 | Maier et al. | 30/392 |

FOREIGN PATENT DOCUMENTS

| | | | |
|---|---|---|---|
| 1279923 | 10/1968 | Germany | 30/394 |
| 2075421 | 11/1981 | United Kingdom | 30/392 |

*Primary Examiner*—Hwei-Siu Payer
*Attorney, Agent, or Firm*—Michael J. Striker

[57] ABSTRACT

A compass saw has a lifting rod for receiving a saw blade which extends downwardly beyond a base plate and supported under the base plate in the region of a saw blade back. A supporting element is formed as a sword extending parallel and in alignment with the saw blade. The saw blade is secured from lateral deviation and bending in that the sword is turnable about an axis located above the base plate and extending substantially parallel to the base plate.

13 Claims, 4 Drawing Sheets

COMPASS SAW

BACKGROUND OF THE INVENTION

The present invention in general relates to compass saws.

More particularly, it relates to a compass saw which has a base plate and a lifting rod for receiving a saw blade as well as a guiding sword forming support means.

Compass saws of the above mentioned general type are known in the art. One of such compass saw is disclosed in U.S. Pat. No. 1,940,483. In this patent a textile cutting machine operates as a compass saw and has a reciprocating cutter with a back supported in a guide formed as a sliding rail. The guide is arranged between the housing of the textile cutting machine and its base plate. Similarly to the cutter, the does not project under the base surface of the base plate.

The German patent document DE-OS 41 04 296 discloses a compass saw of the same type. In this reference the compass saw has a sword which is fixed with the housing under a base plate and formed as a tongue in alignment with the saw blade. The sword operates for receiving a second base plate which is displaceable along the sword and extends parallel to the first base plate. The base plate is fixed on the sword. This sword first of all forms a support for the second base plate and, together with the second base plate, adds a relatively high additional weight to the compass saw. Moreover, for works during which the sword and the second base plate are needed, the mounting expense for removing these parts is substantially high.

The textile cutting machine has the disadvantage that the sword is suitable only for guidance of the compass saw blades above the base plate. The known compass saw has the disadvantage that either the available sword must be used always during sawing, or a complicated, time-consuming dismounting of the sword must be taken into consideration for the cases when a sawing without sword is advantageous.

Another disadvantage of the known compass saws is the rigid arrangement of the sword so that during swinging compass sawing the saw blade back is supported only temporarily and is not supported in particular during the swinging sword of the saw blade in the feed direction. The saw blade back moves away from the sword when a stabilization of the saw blade during engagement in the workpiece must be most efficient and is needed the most.

The operational results with the known saw blades having the guiding sword are only significantly better than for the saw blades without the guiding sword.

SUMMARY OF THE INVENTION

Accordingly, it is an object of the present invention to provide a compass saw of the above mentioned general type, which avoids the disadvantages of the prior art.

In keeping with these objects and with others which will become apparent hereinafter, one feature of the present invention resides, briefly stated, in a compass saw in which the guiding sword is arranged turnably about an axis located above the base plate and extending substantially parallel to the base plate.

When the compass saw is designed in accordance with the present invention, for works with or without a sword, the sword can be just folded rearwardly or forwardly.

In accordance with a further feature of the present invention, the sword can be pressed elastically on the saw blade back and therefore continuously follow the swinging stroke movement of the saw blade.

In accordance with still a further feature of the present invention, it is possible to displace the sword axially. A stabilizing three-leg support is provided together with a front edge of the base plate, so that the plunging sawing cut can be performed with the inventive compass saw in an especially reliable manner.

The continuous support of the saw blade during the swinging stroke provides for substantially improved operational results than in the known compass saws.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
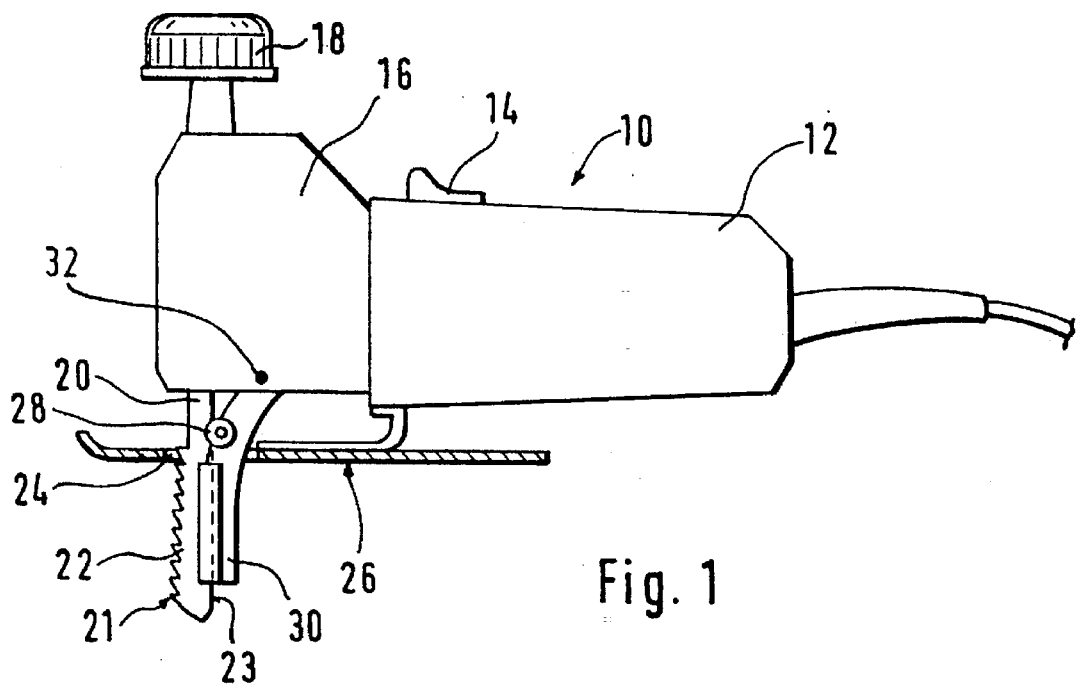
FIG. 1 is a side view of a compass saw in accordance with a first embodiment of the present invention.

A compass saw 10 shown in FIG. 1 has a motor housing 12 provided with an on-off switch 14. A transmission housing 16 is mounted on the motor housing 12. The motor housing 12 operates both as a main handle, while a knob-like auxiliary handle 18 is arranged on the upper end side of the transmission housing 16. A lifting rod 20 extends outwardly beyond the lower end side of the transmission housing 16 vertically downwardly. A saw blade 22 is releasably clamped on the lifting rod 12. The saw blade 22 has a row of teeth 21 and a back 23 extends axially downwardly through a slot 24 in a base plate 26. The base plate 26 operates for a skid-like guidance of the saw blade 10 over a not shown workpiece. The saw blade rear 23 is supported on a guiding rod 28 above the base plate 26 near the end of the lifting rod 20. Moreover, the saw blade back 23 is supported under the base plate 26 against a guiding sword 30 which surrounds the saw blade rear 23 in the form of the U-profile over a great surface.

The guiding sword 30 is arranged in a not shown hinge means turnably on the transmission housing 16 about an axis 32. It is held there by a not shown spring-elastic means, so that it is supported with a certain pretensioning force against the saw blade back 23.

Figure 2:
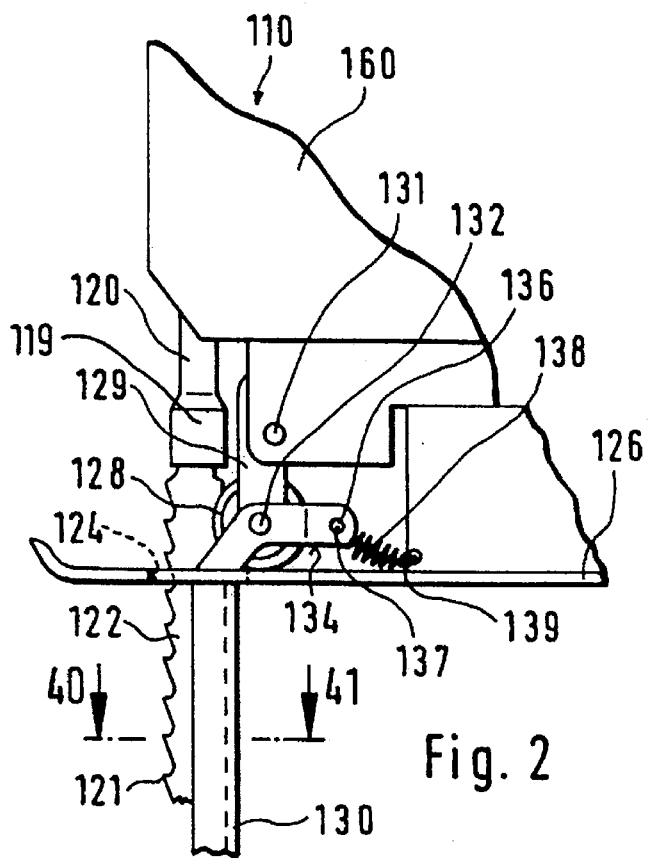
FIG. 2 is a view showing the details of the inventive saw blade with a guiding sword.

In a side view of FIG. 2, a further embodiment of a compass saw 110 is shown with a guiding sword 130 on the transmission housing 160. The free end of the lifting rod 120 which is formed as a stepped collar carries a clamping device 119 for receiving the saw blade 122 which carries a plurality of teeth 121 on its left side as considered in the observation direction. The saw blade 122 extends through the throughgoing slot 124 and the base plate 126. The saw blade back 123 is supported in a rotatable guiding roller 128 which is carried by a bearing block 129.

The bearing block 129 is connected by a rivet 131 with the lower part of the transmission housing 160. The bearing block 129 is supported springy relative to the transmission housing 160, so that the guiding roller 128 in turn abuts springy against the saw blade back 123.

The guiding sword 130 is supported in a full length on the saw blade back 123 and mounted turnably on the bearing block 129 about an axis 132. The axis 132 simultaneously forms the rotary axis for the guiding roller 128. A sword arm 134 which is bent perpendicularly to the sword 130, carries on its free end an opening 136, and a left spring end 137 of a pulling spring 138 engages in the opening. The pulling spring engages with its right spring end 139 in a not shown opening of a transmission housing 116 in a form locking manner.

Figure 3:
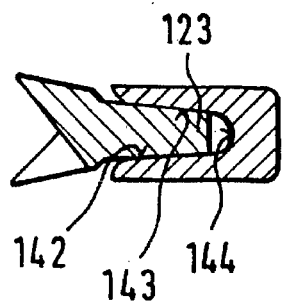
FIG. 3 is a view showing a section through the saw blade with the sword of the compass of FIG. 2.

FIG. 3 which is a cross-section through the saw blade 122 and the sword 130 of FIG. 2 along the arrows 40, 41 shows how the saw blade back 123 is guided in the guiding sword 130 on its groove flanks 142, 143 and a groove 144. The saw blade 122 conically narrows toward the saw blade back 123, and the course of the groove flanks 142, 143 follows the contour of the saw blade back 123.

Figure 4:
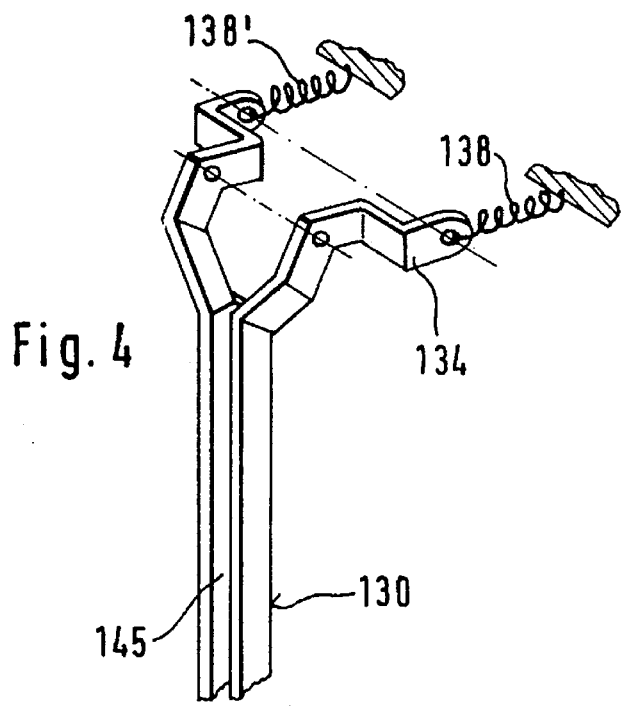
FIG. 4 is a perspective view of the guiding sword of FIGS. 2 and 3.

The guiding sword 130 in correspondence with FIGS. 2 and 3 is shown in detail in FIG. 4. A second sword arm 135 is arranged mirror-symmetrical relative to the first sword arm 134, symmetrically to the sword axis. The sword arm 135 is elastically held on a transmission housing 116 by a second pulling spring 138' which is identical with the first pulling spring 138. The sword 130 is formed as a profiled metal plate and the guiding groove 145 is formed by a U-shaped design of the plate.

Figure 5:
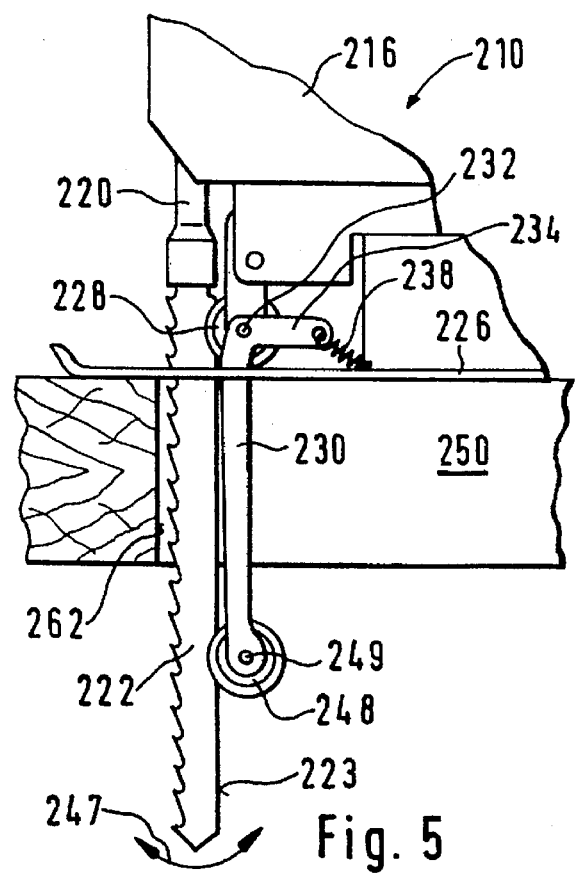
FIG. 5 is a side view of a saw blade with a back support of a compass saw in accordance with a further embodiment of the present invention.

FIG. 5 illustrates a further embodiment of a compass saw 210. With the exception of the design of the sword end of the guiding sword 230, it corresponds to the compass saw of FIG. 2.

The transmission housing 216 carries a lifting rod 220 which receives a saw blade 222. A sword 230 abuts against the saw blade back 224 over a lower guiding roller 248. The guiding roller 248 is rotatably arranged on an end of the guiding sword 230 by an axle 249. An upper sword arm 233, to which a not shown second symmetrical sword arm belongs, is bent perpendicular to the sword tooth 30 and held elastically on the transmission housing 216 by a spring 238 in correspondence with the embodiment of FIG. 2. The saw blade back 223 is guided in a peripheral groove of the guiding roller 248 in a linear contact, as well as by the upper guiding roll 228 and therefore secured from lateral deviations. The compass saw 210 is placed with its base plate 226 on a workpiece 250. The sword 230 can follow a swinging movement of the saw blade 222 in the feeding direction along the arrow 247 by turning about the axle 232. The sword 230 causes an especially stiff support of the saw blade 220 against an edge 262 to be cut of the working piece.

Figure 6:
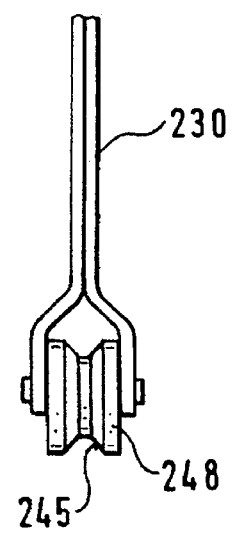
FIG. 6 is a view of the sword of the compass saw of FIG. 5 from behind.

FIG. 6 shows the details of the guiding sword 230 with the lower guiding roller 248. It can be seen that the guiding roller 248 is provided with a V-shaped guiding groove 245 for supporting and guiding the saw blade back 223.

Figure 7:
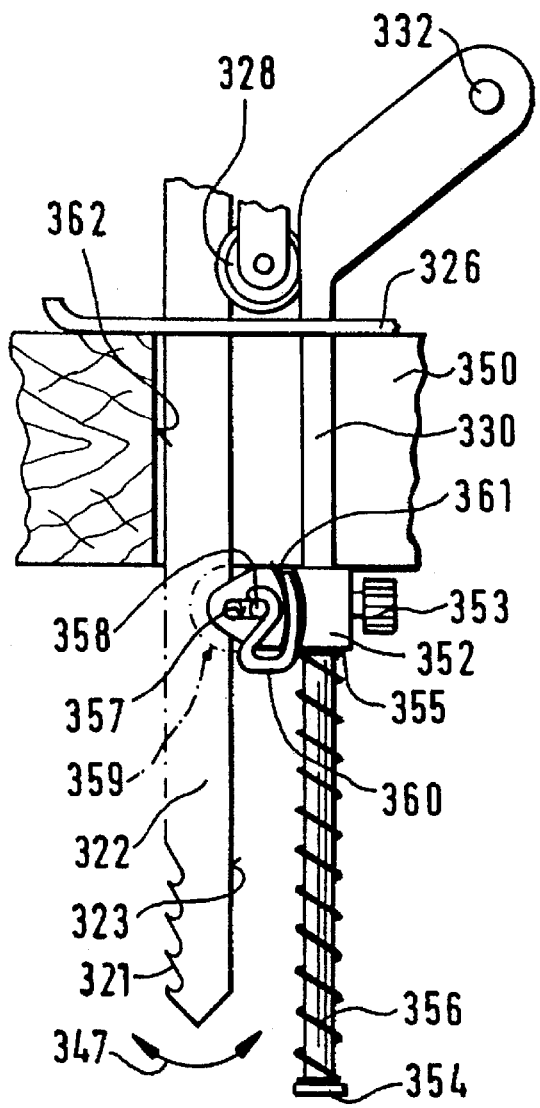
FIG. 7 is a view showing a further embodiment of a sword with a roller guidance of the inventive compass saw.

FIG. 7 shows a further embodiment of the guiding sword 330 together with the saw blade 322 wherein a base plate 326 and a workpiece 350 can be seen as well. The guiding sword 330 is turnable back in about an axle 332 arranged on the saw blade above the base plate 326 when its supporting function is not needed.

The guiding sword 330 carries as a stand a fork-shaped swinging roller holder 352 which is longitudinally displaceable and fixable by a fixing screw 353 relative to the guiding sword 330. The saw 330 carries an abutment 354 on its lower free end. A pressure spring 356 is supported between the abutment 354 and the lower side 355 of the swinging roller holder 352 and urges the swinging roller holder 355 up to displace upwardly in the observation direction along an arrow 347. The swinging roller holder 352 has an elongated hole 357 laterally and extending in a feeding direction. The axle 358 of a guiding roller 359 is displaceably arranged in the elongated hole 357. The periphery of the guiding roller 359 is shown in a broken line. The axle 358 is surrounded by an end of a bracket spring 360. The other end of the bracket spring is clamped in a groove-shaped passage 361 of the swinging roller holder 352. The spring wire 360 is pretensioned so that it urges the axle 358 in direction toward the saw blade back 323. Thereby the guiding roller 359 always follows the swinging movement of the saw blade 322 remains always tight guiding contact with the saw blade back 323.

The teeth 321 of the saw blade 322 extend along the cutting edge 362 in the workpiece 350. In the cutting passage located behind it, the guiding sword 330 follows the saw blade back 323. The upper guiding roller 328 guides the saw blade back 323 above the base plate 326 surrounding it at both sides and follows its swinging movement.

Figure 8:
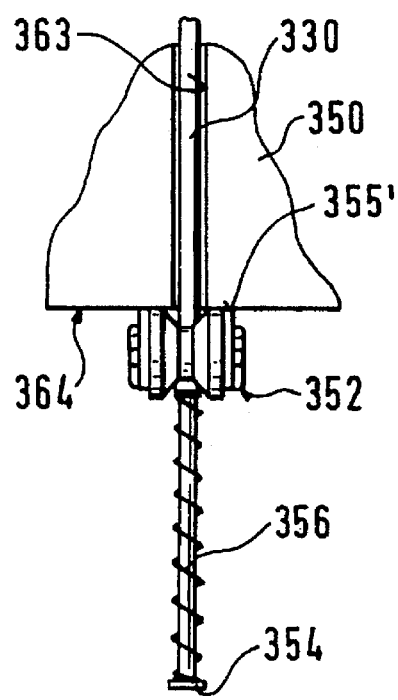
FIG. 8 is a view of FIG. 7 as seen from the rear during entry of the saw blade into a workpiece.

FIG. 8 shows the elements of FIG. 7 without the saw blade at the left side in the observation direction, wherein the slot 363 in the workpiece 350 and the sword 330 guided in it are clearly illustrated. The swinging roller holder 352 is supported with its upper end side 355' against the workpiece lower side 364. In particular it is pretensioned from above by the pressure spring 356 which is arranged between the abutment 354 and the lower edge 355 of the swinging roller holder 352.

Figure 9:
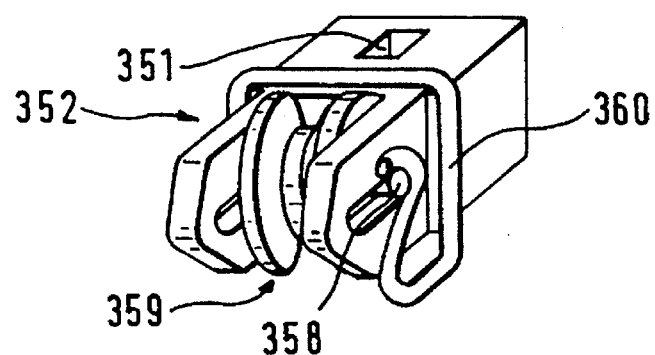
FIG. 9 is a view showing one of the rollers on the sword of the compass saw of FIGS. 7 and 8.

FIG. 9 shows a detail of the swinging roller holder 352 in accordance with FIGS. 7 and 8. The guiding slot 351 which operates as a sliding guide is provided for passage of the sword 330 and formed as a square opening. The bracket spring 360 urges the axle 358 together with the guiding roller 359 into the elongated opening 357 to displace forwardly.

Figure 10:
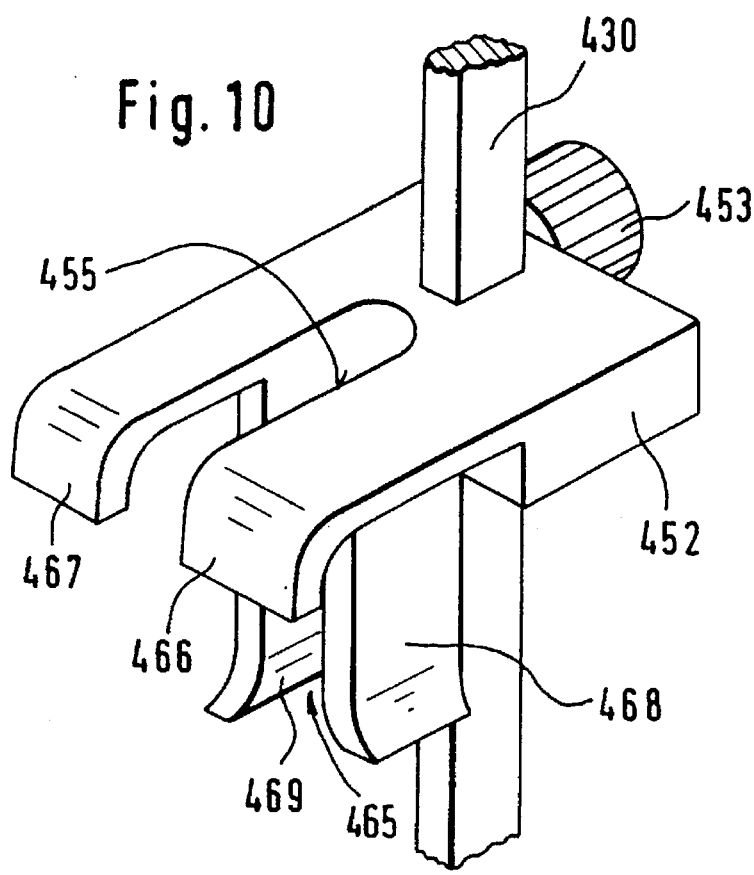
FIG. 10 is a perspective view of a sliding guide piece of the inventive compass saw on an enlarged scale.

FIG. 10 shows an embodiment of a guiding member 452. The guiding member, in correspondence with the swinging roller holder 352 of FIGS. 7–9 is displaceable along the sword 430. The guiding member 452 engages the not shown saw blade or the saw blade back as a sliding member with a flat contact. The guiding member 452 is fixed by fixing screw 453 relative to the sword 430 in each displacing position. A horizontal, subdivided skid-shaped region 466, 467 of the guiding member 452 forms a horizontal slot 455 for entrance of the not shown saw blade back. Two vertical tongues 468, 469 form a vertical slot 465 with a funnel-shaped slot end for a large-surface abutment and guidance of the saw blade back and also the flat sides of the saw blade.

Figure 11:
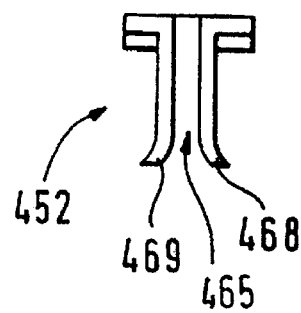
FIG. 11 is a view showing a section of the sliding guide piece of FIG. 10.

FIG. 11 shows on a reduced scale the guiding member 452 of FIG. 10 from the front. The funnel-shaped design of the downwardly open vertical tongues 468, 469 with the vertical slot 465 can be clearly recognized from this drawing.

Figure 12:
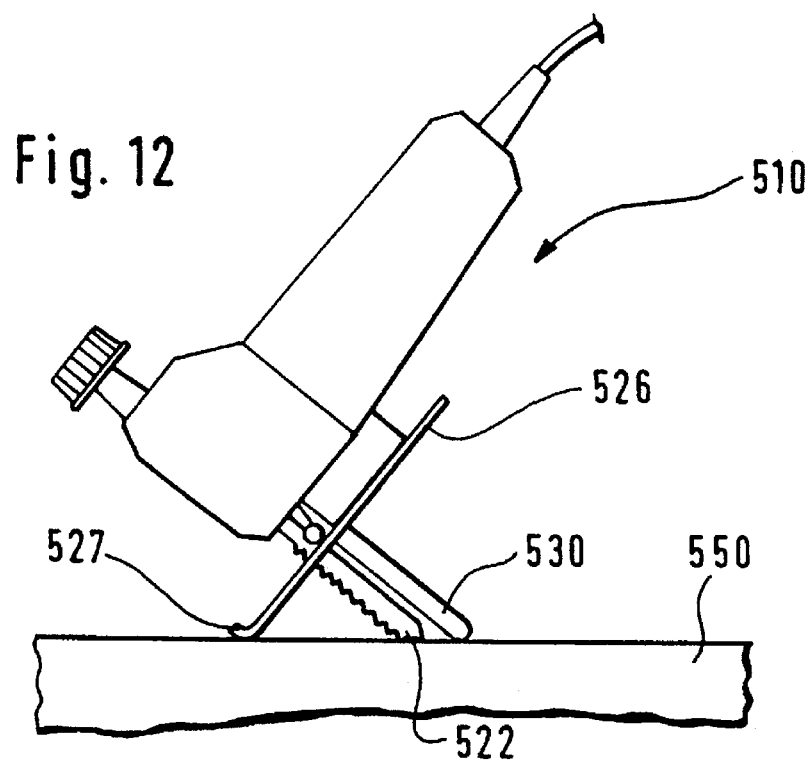
FIG. 12 is a view showing an inventive compass saw during a plunge sawing.

FIG. 12 shows an inventive compass saw 510 during a plunge or immersion sawing. An axially springy displaceable sword 530 extends parallel to the saw blade 522 and serves as a supporting leg for abutment on a workpiece 550. Together with the front edge 527 of the base plate 526, the sword 530 forms a three-point support. With this support the immersion of the saw blade 522 into the workpiece 550 to be sawed is controllably guided. However, the sword 530 does not follow the swinging movement of the saw blade during the immersion.

As shown in FIGS. 1–10, the guiding sword is supported against the region of the saw blade arranged under the base plate, either directly or through a guiding member arranged on the guiding sword. The bending of the saw blade is prevented better when the distance between the two guides under and above the base plate 126 is smaller. The roller guides have lower wear than the slide guides. The slide guides however have the advantage of the large-surface abutment against the saw blade and therefore better guiding properties.

It will be understood that each of the elements described above, or two or more together, may also find a useful application in other types of constructions differing from the types described above.

While the invention has been illustrated and described as embodied in a compass saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A compass saw, comprising a base plate; a saw blade having a plurality of teeth provided on one side and a saw blade back provided on the other side, said saw blade extending beyond said base plate downwardly and being supported under said base plate on said saw blade back; a lifting rod for receiving said saw blade; a guiding sword forming a supporting element for said saw blade and extending parallel and in alignment with said saw blade beyond said base plate, said guiding sword being turnable about an axis which is located above said base plate and extending substantially parallel to said base plate.

2. A compass saw as defined in claim 1, wherein said saw blade is arranged so that it performs a swinging movement, said guiding sword being arranged swingingly and follows said swinging movement of said saw blade.

3. A compass saw as defined in claim 1, wherein said guiding sword is supported elastically and directly on said saw blade back, and surrounds said saw blade at both sides at least partially.

4. A compass saw as defined in claim 1, wherein said guiding sword carries a guiding member which is displaceable and rotatable so that said guiding sword abuts against said saw blade back through said guiding member.

5. A compass saw as defined in claim 4, wherein said guiding member carries a guiding roller provided for engaging said saw blade back and arranged in a rotatable and elastically displaceable manner.

6. A compass saw as defined in claim 4, wherein said guiding member is provided with sliding tongues for guiding said saw blade and is formed as a one-piece element composed of sintered metal.

7. A compass saw as defined in claim 1, wherein said sword surrounds said saw blade back in a U-shaped manner, said saw blade has a cutting depth which is wider than a width of said sword.

8. A compass saw, comprising a base plate; a saw blade having a plurality of teeth provided on one side and a saw blade back provided on the other side, said saw blade extending beyond said base plate downwardly and being supported under said base plate on said saw blade back; a lifting rod for receiving said saw blade; a guiding sword forming a supporting element for said saw blade and extending parallel and in alignment with said saw blade, said guiding sword being turnable about an axis which is located above said base plate and extending substantially parallel to said base plate, said guiding sword carrying a guiding member which is displaceable and rotatable so that said guiding sword abuts against said saw blade back through said guiding member, said guiding member being arranged displaceably along said sword.

9. A compass saw, comprising a base plate; a saw blade having a plurality of teeth provided on one side and a saw blade back provided on the other side, said saw blade extending beyond said base plate downwardly and being supported under said base plate on said saw blade back; a lifting rod for receiving said saw blade; a guiding sword forming a supporting element for said saw blade and extending parallel and in alignment with said saw blade, said guiding sword being turnable about an axis which is located above said base plate and extending substantially parallel to said base plate, said guiding sword carrying as guiding member which is displaceable and rotatable so that said guiding sword abuts against said saw blade back through said guiding member, said guiding member being arranged so that during sawing a workpiece said guiding member is elastically supported on its lower side and therefore presses the workpiece against the base plate.

10. A compass saw, comprising a base plate; a saw blade having a plurality of teeth provided on one side and a saw blade back provided on the other side, said saw blade extending beyond said base plate downwardly and being supported under said base plate on said saw blade back; a lifting rod for receiving said saw blade; a guiding sword forming a supporting element for said saw blade and extending parallel and in alignment with said saw blade, said guiding sword being turnable about an axis which is located above said base plate and extending substantially parallel to said base plate, said guiding sword carrying a guiding member which is displaceable and rotatable so that said guiding sword abuts against said saw blade back through said guiding member, said guiding member carrying a guiding roller provided for engaging said saw blade back and arranged in a rotatable and elastically displaceable manner, said guiding roller being provided with sliding surfaces formed on sliding tongues and supported on said saw blade.

11. A compass saw as defined in claim 10, wherein said sliding surfaces are supported on said saw blade from both sides of said saw blade.

12. A compass saw, comprising a base plate; a saw blade having a plurality of teeth provided on one side and a saw blade back provided on the other side, said saw blade extending beyond said base plate downwardly and being supported under said base plate on said saw blade back; a lifting rod for receiving said saw blade; a guiding sword forming a supporting element for said saw blade and extending parallel and in alignment with said saw blade, said guiding sword being formed as a supporting leg which is supportable on a workpiece and has a lower end providing a support for immersion sawing.

13. A compass saw, comprising a base plate; a saw blade having a plurality of teeth provided on one side and a saw blade back provided on the other side, said saw blade extending beyond said base plate downwardly and being supported under said base plate on said saw blade back; a lifting rod for receiving said saw blade; a guiding sword forming a supporting element for said saw blade and extending parallel and in alignment with said saw blade, said guiding member has a releasable fixing device which is axially displaceable on said guiding sword and fixable relative to said guiding sword.

* * * * *